(12) United States Patent
Tomita et al.

(10) Patent No.: US 10,495,178 B2
(45) Date of Patent: Dec. 3, 2019

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Yusuke Tomita, Neyagawa (JP); Keisuke Sakai, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/057,768

(22) Filed: Aug. 7, 2018

(65) Prior Publication Data

US 2019/0063549 A1 Feb. 28, 2019

(30) Foreign Application Priority Data

Aug. 23, 2017 (JP) ................................ 2017-159894

(51) Int. Cl.
*F16F 15/14* (2006.01)
*F16H 45/02* (2006.01)

(52) U.S. Cl.
CPC ........ *F16F 15/145* (2013.01); *F16F 15/1421* (2013.01); *F16H 45/02* (2013.01); *F16H 2045/0263* (2013.01)

(58) Field of Classification Search
None
See application file for complete search history.

(56) References Cited

U.S. PATENT DOCUMENTS

| 2,387,776 A * | 10/1945 | Salomon | F16F 15/145 74/574.2 |
| 2002/0062713 A1* | 5/2002 | Feldhaus | F16F 15/145 464/180 |
| 2011/0031058 A1* | 2/2011 | Klotz | F16F 15/145 180/381 |
| 2014/0083242 A1* | 3/2014 | Oh | F16F 15/145 74/574.2 |
| 2014/0305258 A1* | 10/2014 | Bertram | F16F 15/30 74/574.2 |

FOREIGN PATENT DOCUMENTS

JP 2017-40318 A 2/2017

* cited by examiner

*Primary Examiner* — Colby M Hansen
(74) *Attorney, Agent, or Firm* — United IP Counselors, LLC

(57) ABSTRACT

A torque fluctuation inhibiting device includes a mass body. The mass body disposed to be rotatable with a rotor and be rotatable relatively to the rotor. Each of a plurality of centrifugal elements is radially movable by a centrifugal force that acts thereon in rotation of the rotor and the mass body. When a relative displacement is produced between the rotor and the mass body in a rotational direction while the centrifugal force is acting on the each of the plurality of centrifugal elements, each of a plurality of cam mechanisms converts the centrifugal force into a circumferential force directed to reduce the relative displacement. A plurality of restriction members allow the plurality of centrifugal elements to move in actuation of the plurality of cam mechanisms, and restrict the plurality of centrifugal elements from moving radially inward in non-actuation of the plurality of cam mechanisms.

15 Claims, 12 Drawing Sheets

TORQUE FLUCTUATION INHIBITING DEVICE, TORQUE CONVERTER AND POWER TRANSMISSION DEVICE

CROSS-REFERENCE TO RELATED APPLICATIONS

This application claims priority to Japanese Patent Application No. 2017-159894 filed on Aug. 23, 2017, the entirety of which is hereby incorporated by reference in its entirety.

BACKGROUND

Technical Field

The present disclosure relates to a torque fluctuation inhibiting device, particularly to a torque fluctuation inhibiting device for inhibiting torque fluctuations in a rotor, to which a torque is inputted, and that is rotated about a rotational axis. Additionally, the present disclosure relates to a torque converter and a power transmission device, each of which includes the torque fluctuation inhibiting device.

Background Information

For example, a clutch device, including a damper device, and a torque converter are provided between an engine and a transmission in an automobile. Additionally, for reduction in fuel consumption, the torque converter is provided with a lock-up device for mechanically transmitting a torque at a predetermined rotational speed or greater.

In the lock-up device described above, torque fluctuations (fluctuations in rotational velocity) are inhibited by a damper including a plurality of torsion springs. Incidentally, a type of lock-up device including a torque fluctuation inhibiting device has been also proposed as described in Japan Laid-open Patent Application Publication No. 2017-40318.

The torque fluctuation inhibiting device described in Japan Laid-open Patent Application Publication No. 2017-40318 includes an inertia ring, centrifugal elements and cam mechanisms. The inertia ring is disposed to be rotatable relatively to an output-side rotor. Each centrifugal element is disposed to receive a centrifugal force to be generated by rotation of the output-side rotor and the inertia ring. When a relative displacement is produced between the output-side rotor and the inertia ring in a rotational direction while the centrifugal force is acting on each centrifugal element, each cam mechanism converts the centrifugal force into a circumferential force directed to reduce the relative displacement.

In the torque fluctuation inhibiting device described in Japan Laid-open Patent Application Publication No. 2017-40318, torque fluctuations are inhibited by the actuation of each cam mechanism. Especially, in the device described in Japan Laid-open Patent Application Publication No. 2017-40318, the centrifugal force acting on each centrifugal element is used as a force for inhibiting torque fluctuations. Hence, a characteristic of inhibiting torque fluctuations varies in accordance with the rotational speed of the rotor. Therefore, in the device described in Japan Laid-open Patent Application Publication No. 2017-40318, a peak of torque fluctuations can be reduced in a wide rotational speed range.

Now, in the device described in Japan Laid-open Patent Application Publication No. 2017-40318, each centrifugal element is provided to be movable in a radial direction. Therefore, when the engine stops or when the cam mechanisms transition from actuation to non-actuation, chances are that part or the entirety of the centrifugal elements are moved radially inward and collide with, for instance, part of the output-side rotor supporting the centrifugal elements. Thus, there is a drawback that hitting sound is produced in collision of the centrifugal elements.

BRIEF SUMMARY

It is an object of the present disclosure to inhibit, in a torque fluctuation inhibiting device using a centrifugal element, a hitting sound from being produced in a collision of the centrifugal element against another member.

(1) A torque fluctuation inhibiting device according to the present disclosure is a device for inhibiting torque fluctuations in a rotor to which a torque is inputted. The torque fluctuation inhibiting device includes a mass body, a plurality of centrifugal elements, a plurality of cam mechanisms and a plurality of restriction members. The mass body is disposed to be rotatable with the rotor and be rotatable relatively to the rotor. Each of the plurality of centrifugal elements is radially movable by a centrifugal force acting thereon in rotation of the rotor and the mass body. When a relative displacement is produced between the rotor and the mass body in a rotational direction while the centrifugal force is acting on the each of the plurality of centrifugal elements, each of the plurality of cam mechanisms converts the centrifugal force into a circumferential force directed to reduce the relative displacement. The plurality of restriction members allow the plurality of centrifugal elements to move in actuation of the plurality of cam mechanisms, and restrict the plurality of centrifugal elements from moving radially inward in non-actuation of the plurality of cam mechanisms.

When a torque is inputted to the rotor in this device, the rotor and the mass body are rotated. When the torque inputted to the rotor does not fluctuate, any relative displacement is not produced between the rotor and the mass body in the rotational direction. Therefore, the rotor and the mass body are rotated in synchronization with each other. On the other hand, when the torque inputted to the rotor fluctuate, a relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, each centrifugal element receives a centrifugal force. Then, when the relative displacement is produced between the rotor and the mass body, each cam mechanism converts the centrifugal force acting on each centrifugal element into a circumferential force, and the circumferential force acts to reduce the relative displacement between the rotor and the mass body. Torque fluctuations are inhibited by the herein described actuation of the cam mechanism.

The centrifugal force acting on each centrifugal element is herein used as a force for inhibiting torque fluctuations. Hence, a characteristic of inhibiting torque fluctuations varies in accordance with the rotational speed of the rotor. Additionally, the characteristic of inhibiting torque fluctuations can be appropriately set by, for instance, the cam shape or so forth. Hence, a peak of torque fluctuations can be reduced in as wide a rotational speed range as possible.

Additionally, in this device, the restriction members restrict the centrifugal elements from moving radially inward in non-actuation of the can mechanisms. Therefore, it is possible to avoid a situation that the centrifugal elements are moved radially inward in non-actuation of the cam mechanisms and collide with another member such as the rotor, whereby hitting sound is produced. Additionally, even when the centrifugal elements collide with another member, hitting sound can be inhibited from being produced. It should be noted that in actuation of the cam mechanisms, the restriction members allow movement of the centrifugal elements, whereby actuation of the cam mechanisms is not hindered.

(2) Preferably, the plurality of centrifugal elements are disposed in circumferential alignment, and each of the plurality of restriction members is disposed circumferentially between adjacent two of the plurality of centrifugal elements.

(3) Preferably, the each of the plurality of restriction members includes a first contact portion provided on one circumferential end thereof and a second contact portion provided on the other circumferential end thereof. The first contact portion is contactable to a first circumferential side lateral surface of one of the adjacent two of the plurality of centrifugal elements. Additionally, the second contact portion is contactable to a second circumferential side lateral surface of the other of the adjacent two of the plurality of centrifugal elements.

The first and second contact portions of each restriction member herein make contact with the lateral surfaces of the adjacent two centrifugal elements, respectively. With the contact, the adjacent two centrifugal elements are restricted from moving radially inward.

(4) Preferably, the each of the plurality of restriction members is elastically deformable in accordance with movement of the adjacent two of the plurality of centrifugal elements. Movement of the adjacent two centrifugal elements is herein restricted by elastic deformation of each restriction member. Therefore, contact can be constantly made between each restriction member and the adjacent two centrifugal elements, whereby hitting sound can be inhibited from being produced in collision of the adjacent two centrifugal elements against another member.

(5) Preferably, the each of the plurality of restriction members is elastically deformable in directions making the first contact portion and the second contact portion approach each other.

(6) Preferably the rotor includes a plurality of recesses on an outer peripheral surface thereof, and the plurality of centrifugal elements are accommodated in the plurality of recesses of the rotor, respectively. Additionally, the plurality of restriction members restrict inner peripheral surfaces of the plurality of centrifugal elements from making contact with bottom surfaces of the plurality of recesses, respectively.

In rotation of the rotor and the mass body, each centrifugal element is herein going to move radially outward by the centrifugal force acting thereon. On the other hand, in deactivation of each cam mechanism as seen, for instance, when rotation of the rotor and the mass body are stopped, the centrifugal force no longer acts on each centrifugal element. Therefore, when the restriction members are not provided, one of the centrifugal elements, located in an upper position, drops downward and collides with the bottom surface of the corresponding one of the recesses. Hitting sound is supposed to be produced in this collision.

Additionally, in actuation of each cam mechanism, a reaction force of the centrifugal force (i.e., a force directed radially inward) is applied to each centrifugal element from each cam mechanism. Therefore, when the rotor and the mass body are prevented from rotating relatively to each other by a stopper mechanism and/or so forth, in other words, when each cam mechanism transitions from actuation to non-actuation, each centrifugal element is going to move radially inward due to inertia. At this time, similarly to the above, each centrifugal element collides with the bottom surface of each recess, whereby hitting sound is supposed to be produced.

However, the restriction members herein restrict the centrifugal elements from moving radially inward, whereby each centrifugal element is prevented from colliding with the bottom surface of each recess of the rotor. Therefore, hitting sound can be prevented from being produced between each centrifugal element and the bottom surface of each recess in non-actuation of each cam mechanism.

(7) Preferably, the plurality of cam mechanisms each includes a cam and a cam follower. The cam is provided on one of the mass body and the each of the plurality of centrifugal elements. The cam follower is provided on the other of the mass body and the each of the plurality of centrifugal elements, and is moved along the cam.

Here, the amount of the relative displacement between the rotor and the mass body in the rotational direction fluctuates in accordance with the magnitude of torque fluctuations in the rotor. At this time, torque fluctuations can be inhibited as efficiently as possible by setting the shape of the cam such that the circumferential force, into which the centrifugal force is converted, varies in accordance with the amount of the relative displacement.

(8) Preferably, the cam and the cam follower of the each of the plurality of cam mechanisms are not pressed against each other in the non-actuation of the each of the plurality of cam mechanisms. The restriction members herein work when the cam and the cam follower of each cam mechanism are not pressed against each other. In other words, actuation of each cam mechanism is not hindered by the restriction members.

(9) Preferably, the torque fluctuation inhibiting device further includes a stopper mechanism restricting a relative rotation between the rotor and the mass body to a predetermined angular range. Additionally, the plurality of cam mechanisms are not actuated in and after actuation of the stopper mechanism.

(10) Preferably, the torque fluctuation inhibiting device further includes the stopper mechanism. The stopper mechanism restricts the relative rotation between the rotor and the mass body to the predetermined angular range, and includes a stop pin and an elongated hole. The stop pin is supported by one of the rotor and the mass body. The elongated hole, circumferentially elongated, is provided in the other of the rotor and the mass body, and is penetrated by the stop pin.

(11) Preferably, the plurality of restriction members each includes a support portion, a first spring portion and a second spring portion. The support portion is supported by the mass body. The first spring portion extends radially inward from the support portion, and includes the first contact portion on a tip thereof. The second spring portion extends radially inward from the support portion so as to gradually separate from the first spring portion with radially inward extension thereof and includes the second contact portion on a tip thereof.

Torsion springs can be herein provided as the restriction members. Hence, the restriction members can be easily realized.

(12) Preferably, the support portion of the each of the plurality of restriction members is supported by the stop pin. The stop pin, composing part of the stopper mechanism, is herein used for supporting the support portion of each restriction member, whereby the support portion is supported with a simple configuration.

(13) Preferably, the mass body includes a first inertia ring, a second inertia ring and a pin. The first and second inertia rings are disposed in opposition through the rotor. The pin couples the first and second inertia rings so as to make the first and second inertia rings non-rotatable relatively to each other. The plurality of centrifugal elements are disposed on an outer peripheral part of the rotor and on an inner peripheral side of the pin while being disposed axially between the first inertia ring and the second inertia ring. The cam follower is a cylindrical roller that includes a hole, axially penetrated by the pin, in an inner part thereof. The cam is provided on the each of the plurality of centrifugal elements so as to make contact with the cam follower. The cam has a shape making the circumferential force vary in accordance with an amount of the relative displacement between the rotor and the mass body in the rotational direction.

Attachment of the cam follower is herein done with use of the pin coupling the first inertia ring and the second inertia ring. Therefore, the configuration of the cam mechanism is simplified.

(14) A torque converter according to the present disclosure is disposed between an engine and a transmission. The torque converter includes an input-side rotor to which a torque is inputted from the engine, an output-side rotor outputting the torque to the transmission, a damper disposed between the input-side rotor and the output-side rotor, and the torque fluctuation inhibiting device configured as any of the above.

(15) A power transmission device according to the present disclosure includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

Overall, according to the present advancement described above, it is possible to inhibit, in a torque fluctuation inhibiting device using a centrifugal element, a hitting sound from being produced in a collision of the centrifugal element against another member.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
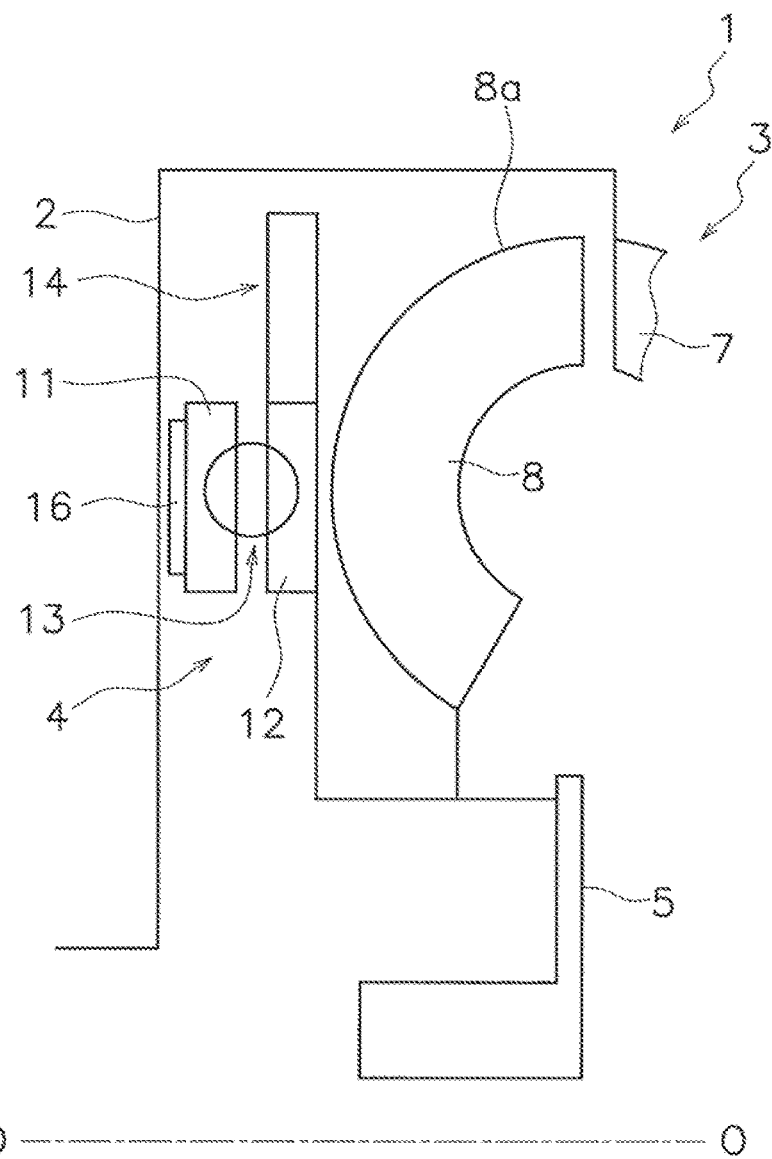
FIG. 1 is a schematic diagram of a torque converter according to a first preferred embodiment of the present disclosure.

FIG. 1 is a schematic diagram in a condition that a torque fluctuation inhibiting device according to a first preferred embodiment of the present disclosure is attached to a lock-up device of a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

Figure 2:
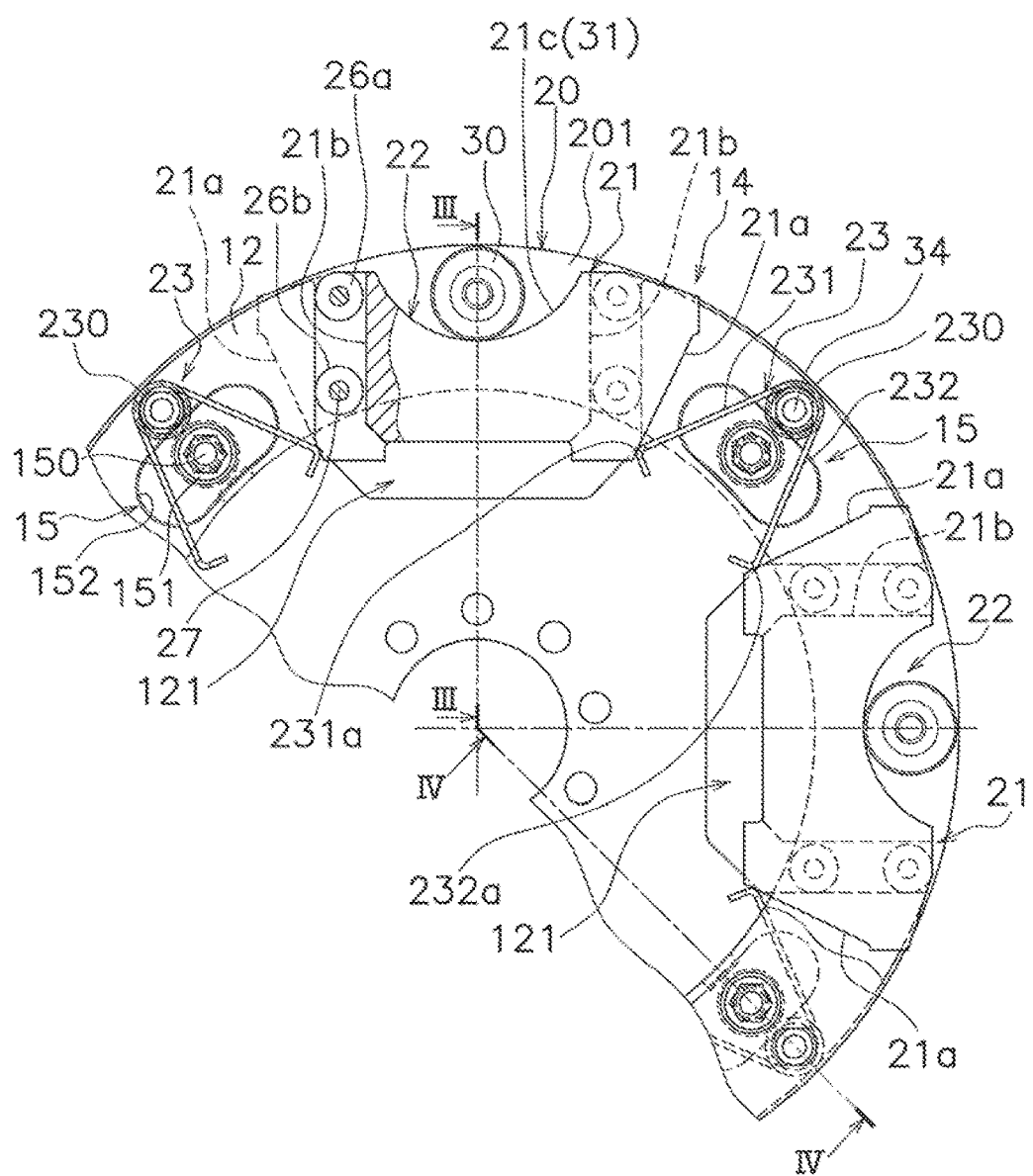
FIG. 2 is a partial front view of a hub flange and a torque fluctuation inhibiting device that are shown in FIG. 1.

The lock-up device 4 includes an input-side rotor 11, a hub flange 12 (an exemplary rotor), a damper 13, a torque fluctuation inhibiting device 14 and stopper mechanisms 15 (see FIG. 2).

The input-side rotor 11 includes an axially movable piston, and is provided with a friction member 16 fixed to the front cover 2-side lateral surface thereof. When the friction member 16 is pressed onto the front cover 2, the torque is transmitted from the front cover 2 to the input-side rotor 11.

The hub flange 12 is disposed in axial opposition to the input-side rotor 11 and is rotatable relatively to the input-side rotor 11. The hub flange 12 is coupled to the output hub 5.

The damper 13 is disposed between the input-side rotor 11 and the hub flange 12. The damper 13 includes a plurality of torsion springs and elastically couples the input-side rotor 11 and the hub flange 12 in a rotational direction. The damper 13 transmits the torque from the input-side rotor 11 to the hub flange 12, and also, absorbs and attenuates torque fluctuations.

[Torque Fluctuation Inhibiting Device 14]

Figure 3:
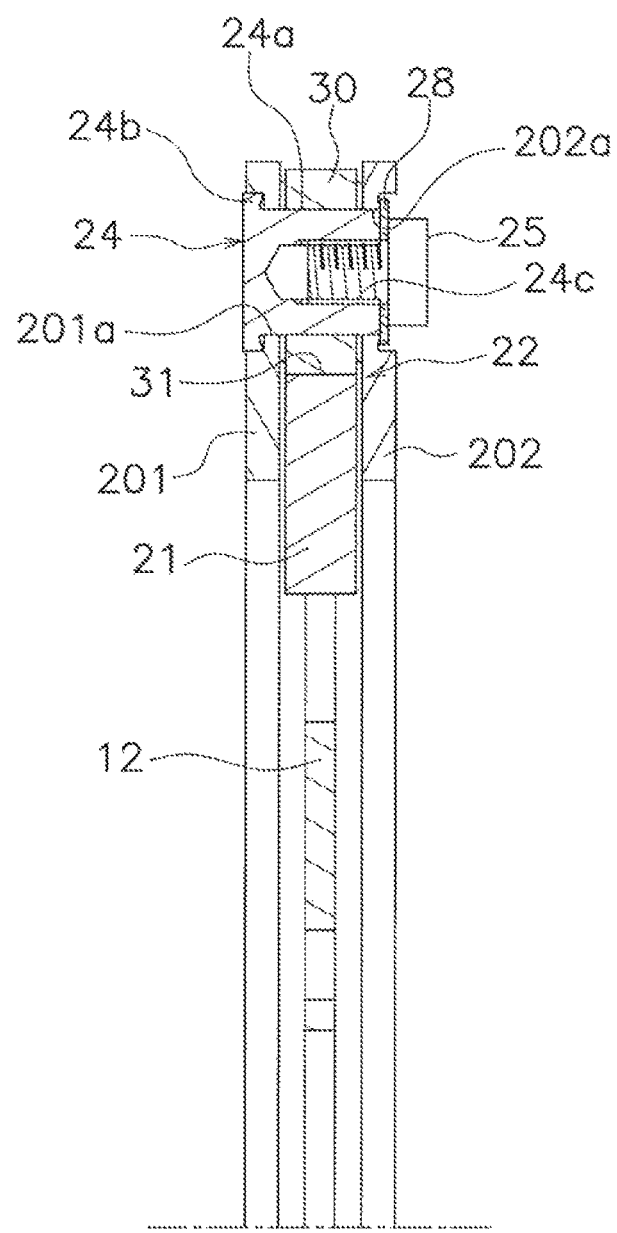
FIG. 3 is a cross-sectional view of FIG. 2 taken along line III-III.
Figure 4:
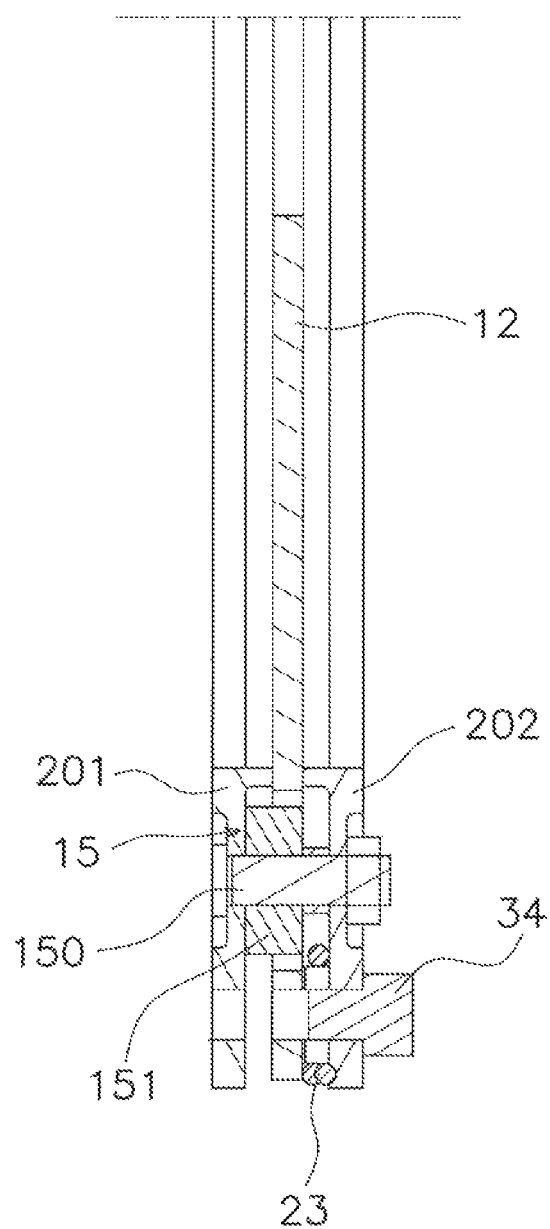
FIG. 4 is a cross-sectional view of FIG. 2 taken along line IV-IV.

The torque fluctuation inhibiting device 14 will be explained in detail with FIGS. 2 to 4. FIG. 2 is a front view of the hub flange 12 and the torque fluctuation inhibiting device 14. It should be noted that FIG. 2 shows a condition that one (near-side one) of inertia rings is detached. Additionally, FIG. 3 is a cross-sectional view of FIG. 2 taken along line III-III, whereas FIG. 4 is a cross-sectional view of FIG. 2 taken along line IV-IV. FIG. 2 and thereafter show part of the hub flange 12 and the torque fluctuation inhibiting device 14.

The torque fluctuation inhibiting device 14 includes first and second inertia rings 201 and 202, which compose a mass body 20, four centrifugal elements 21, four cam mechanisms 22 and four torsion springs 23 as restriction members.

<First and Second Inertia Rings 201 and 202>

Each of the first and second inertia rings 201 and 202 is a continuous annular plate having a predetermined thickness. As shown in FIGS. 3 and 4, the first and second inertia rings 201 and 202 are disposed axially on both sides of the hub flange 12 such that a predetermined gap is produced between the hub flange 12 and each inertia ring 201, 202. In other words, the hub flange 12 and the first and second inertia rings 201 and 202 are disposed in axial alignment. The first and second inertia rings 201 and 202 have a common rotational axis that is the same as the rotational axis of the hub flange 12. The first and second inertia rings 201 and 202 are rotatable with the hub flange 12, and are also rotatable relatively to the hub flange 12 within a predetermined angular range.

As shown in FIG. 3, the first inertia ring 201 includes holes 201a axially penetrating therethrough, while the second inertia ring 202 includes holes 202a axially penetrating therethrough. Additionally, the first and second inertia rings 201 and 202 are fixed by support pins 24, penetrating the holes 201a and 202a, and bolts 25. Therefore, the first inertia ring 201 is axially, radially and rotation-directionally immovable with respect to the second inertia ring 202.

<Hub Flange 12>

As shown in FIG. 2, the hub flange 12 has a disc shape, and as described above, is coupled at the inner peripheral part thereof to the output hub 5. The hub flange 12 includes four recesses 121 on the outer peripheral part thereof. Each recess 121 is recessed to the inner peripheral side and has a predetermined width in the circumferential direction. Each recess 121 is shaped to be opened to the outer peripheral side, and has a predetermined depth.

<Centrifugal Elements 21>

The centrifugal elements 21 are disposed in the recesses 121 of the hub flange 12, respectively, and are radially movable by centrifugal forces to be generated by rotation of the hub flange 12. Each centrifugal element 21 has a circumferentially elongated shape. Both lateral surfaces 21a (both circumferential end surfaces) of each centrifugal element 21 slant to expand from the inner peripheral side to the outer peripheral side. Additionally, both lateral surfaces 21a are provided with grooves 21b, respectively. The width of each groove 21b is greater than the thickness of the hub flange 12. The hub flange 12 (specifically, part of the edge of each recess 121) is inserted into part of each groove 21b.

It should be noted that an outer peripheral surface 21c of each centrifugal element 21 dents in a circular-arc shape to the inner peripheral side, and as described below, functions as a cam 31.

Two rollers 26a and 26b are disposed in each of the grooves 21b provided in both lateral surfaces 21a of each centrifugal element 21. The two rollers 26a and 26b are disposed in radial alignment and are rotatably attached about pins 27 provided to penetrate each groove 21b in the rotational axis direction. Additionally the respective rollers 26a and 26b are capable of rolling along and in contact with the lateral surfaces of each recess 121.

<Cam Mechanisms 22>

Each cam mechanism 22 is composed of a cylindrical roller 30, functioning as a cam follower, and the cam 31 corresponding to the outer peripheral surface 21c of each centrifugal element 21. As shown in FIG. 3, the roller 30 is fitted onto the outer periphery of a trunk portion 24a of each support pin 24, and is rotatably supported by each support pin 24.

As described above, the support pins 24 fix the first inertia ring 201 and the second inertia ring 202. In more detail, as shown in FIG. 3, each support pin 24 includes a brim portion 24b on one end surface thereof and is provided with a screw hole 24c having a predetermined depth on the other end surface thereof. The brim portion 24b is fitted into each of circular grooves provided on the second inertia ring 201. Additionally, each bolt 25 is screwed into the screw hole 24c through each of washers 28. The washers 28 are fitted into circular grooves provided on the second inertia ring 202, respectively. With the configuration described above, the axial gap between the first inertia ring 201 and the second inertia ring 202 depends on the length of the trunk portion 24a of each support pin 24.

It should be noted that each roller 30 is preferably attached to each support pin 24 in a rotatable matter, but alternatively, can be attached thereto in a non-rotatable manner. Each cam 31 is a circular-arc surface with which each roller 30 makes contact. Each roller 31 is moved along each cam 31 when the hub flange 12 and the first and second inertia rings 201 and 202 are rotated relatively to each other in a predetermined angular range.

Although described below in detail, with the contact between each roller 30 and each cam 31, when rotational phase difference is produced between the hub flange 12 and the first and second inertia rings 201 and 202, a centrifugal force generated in each centrifugal element 21 is converted into a circumferential force by which the rotational phase difference is reduced.

<Torsion Springs 23>

The torsion springs 23 allow actuation of the centrifugal elements 21 by the cam mechanisms 22, and prevent radially inward movement of the centrifugal elements 21. In other words, when the rotational phase difference is produced between the hub flange 12 and the first and second inertia rings 201 and 202 and the cam mechanisms 22 are being actuated, the torsion springs 23 do not hinder movement of the centrifugal elements 21. Specifically, when the cam mechanisms 22 are being actuated, the torsion springs 23 are not in contact with the centrifugal elements 21, or contrarily, are in contact with the centrifugal elements 21 without applying pressing forces thereto.

Each torsion spring 23 is disposed circumferentially between adjacent two of the centrifugal elements 21. Additionally, each torsion spring 23 restricts radially inward movement of the centrifugal elements 21 in non-actuation of the cam mechanisms 22.

As shown in FIG. 2, each torsion spring 23 includes a support portion 230, a first spring portion 231 and a second spring portion 232.

The support portion 230 is annularly wound, and is supported by each of pins 34 while being disposed thereabout. As shown in FIG. 4, the pins 34 are attached to the outer peripheral end of the second inertia ring 202.

The first and second spring portions 231 and 232 extend radially inward from the support portion 230. The first and second spring portions 231 and 232 extend while gradually separating from each other in the radially inward direction. Additionally, the first and second spring portions 231 and 232 are elastically deformable in directions approaching each other.

The first spring portion 231 is bent at the tip thereof toward the second spring portion 232 at an angle of approximately 90 degrees with respect to the extending direction thereof. Thus, the bent portion is provided as a first contact portion 231a that makes contact with the inner peripheral end of a lateral surface 21a of one of the adjacent two centrifugal elements 21.

And likewise, the second spring portion 232 is bent at the tip thereof toward the first spring portion 231 at an angle of approximately 90 degrees with respect to the extending direction thereof. Thus, the bent portion is provided as a second contact portion 232a that makes contact with the inner peripheral end of the lateral surface 21a of the other of the adjacent two centrifugal elements 21.

As described above, when the cam mechanisms 22 are being actuated, the torsion springs 23 do not hinder actuation of the cam mechanisms 22 (specifically, movement of the centrifugal elements 21). In other words, the shape of each torsion spring 23 and that of the lateral surface 21a of each centrifugal element 21 are appropriately set. Hence, even when the rotational phase difference is produced between the hub flange 12 and both inertia rings 201 and 202 and the cam mechanisms 22 are actuated whereby the centrifugal elements 21 are radially moved, no change is made for the shape of a triangle formed by connecting a center point of the support portion 230 of each torsion spring 23, a point at which the first contact portion 231a makes contact with the lateral surface 21a of one of the adjacent two centrifugal elements 21, and a point at which the second contact portion 232a makes contact with the lateral surface 21a of the other of the adjacent two centrifugal elements 21.

Therefore, when the cam mechanisms 22 are being actuated, a pressing force is not acting between the first contact portion 231a and one of the adjacent two centrifugal elements 21, and likewise, a pressing force is not acting between the second contact portion 232a and the other of the adjacent two centrifugal elements 21. Therefore, when the cam mechanisms 22 are being actuated, the torsion springs 23 are not elastically deformed.

[Stopper Mechanisms 15]

The stopper mechanisms 15 are mechanisms for restricting relative rotation between the hub flange 12 and the first and second inertia rings 201 and 202 to a predetermined angular range.

As shown in FIG. 4, each of the stopper mechanisms 15 is composed of each of pins 150, each of stop rings 151 and each of elongated holes 152 (see FIG. 2). The pins 150 axially extend between the first inertia ring 201 and the second inertia ring 202. The stop rings 151 are members made of resin or rubber, and each is attached to the outer periphery of each pin 150 while being disposed between the first inertia ring 201 and the second inertia ring 202. In other words, each pin 150 penetrates a hole of each stop ring 151.

The elongated holes 152 are provided in the hub flange 12. Each elongated hole 152 is sized to make each stop ring 151 circumferentially movable, and has a predetermined circumferential length.

The aforementioned configuration makes the hub flange 12 and the first and second inertia rings 201 and 202 rotatable relatively to each other in a range that each stop ring 151 is movable within each elongated hole 152. In other words, the cam mechanisms 22 are not actuated in and after actuation of the stop mechanisms 15.

[Actuation of Cam Mechanisms 22]

Actuation of each cam mechanism 22 (inhibition of torque fluctuations) will be explained with FIGS. 2 and 5. It should be noted that in the following explanation, the pair of first and second inertia rings 201 and 202 will be simply referred to as "an inertia ring 20" on an as-needed basis.

In the lock-up on state, a torque transmitted to the front cover 2 is transmitted to the hub flange 12 through the input-side rotor 11 and the damper 13.

When torque fluctuations do not exist in torque transmission, the hub flange 12 and the inertia ring 20 are rotated in the condition shown in FIG. 2. In this condition, the roller 30 in each cam mechanism 22 is contacted to the most inner peripheral position (circumferential middle position) of the cam 31, and the rotational phase difference between the hub flange 12 and the inertia ring 20 is "0".

As described above, the rotation-directional relative displacement between the hub flange 12 and the inertia ring 20 is referred to as "rotational phase difference". In FIGS. 2 and 5, these terms indicate displacement between the circumferential middle position of each centrifugal element 21 and each cam 31 and the center position of each roller 30.

Figure 5:
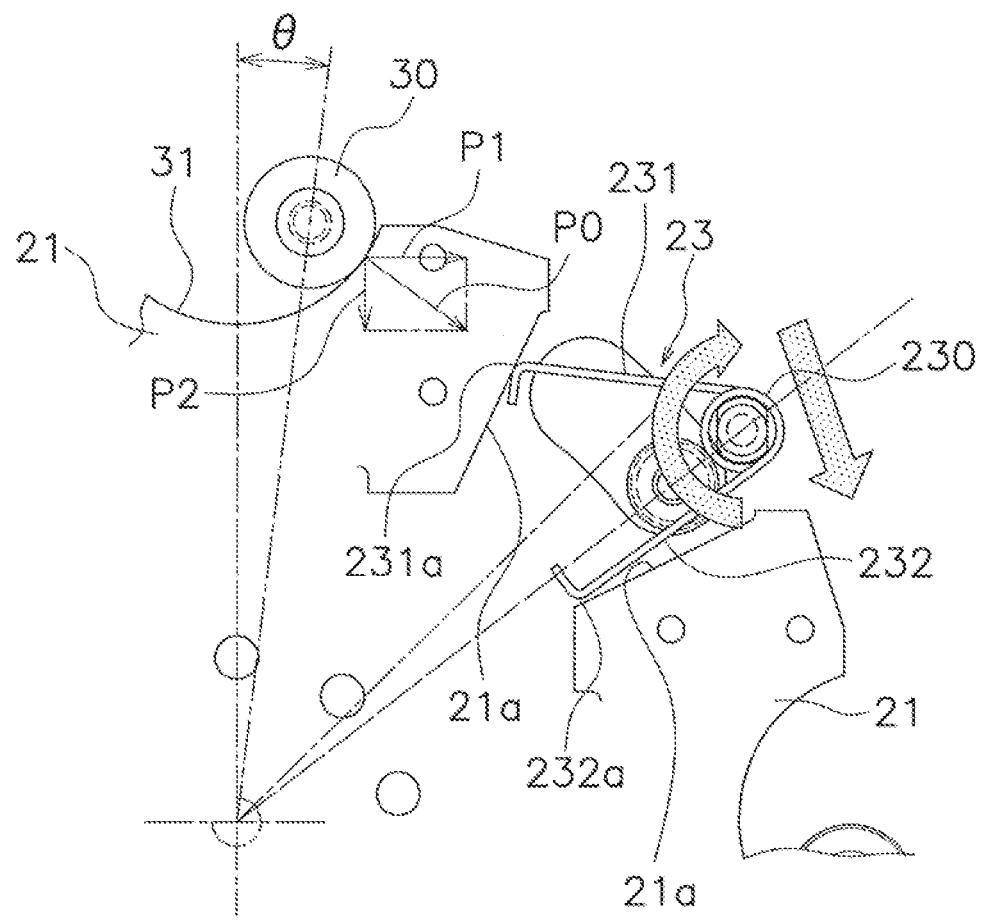
FIG. 5 is a diagram for explaining actuation of a cam mechanism.

When torque fluctuations herein exist in torque transmission, rotational phase difference θ is produced between the hub flange 12 accommodating the centrifugal elements 21 and the inertia ring 20 by which the rollers 30 are supported as shown in FIG. 5.

As shown in FIG. 5, when the rotational phase difference θ is produced between the hub flange 12 and the inertia ring 20, the roller 30 in each cam mechanism 22 is relatively moved along the cam 31 to the right side of FIG. 5. At this time, a centrifugal force acts on each centrifugal element 21. Hence, a reaction force to be received by the cam 31 provided on each centrifugal element 21 from the roller 30 has a direction and a magnitude indicated by P0 in FIG. 5. A first force component P1 and a second force component P2 are produced by the reaction force P0. The first force component P1 is directed in the circumferential direction, whereas the second force component P2 is directed to move each centrifugal element 21 radially inward.

Additionally, the first force component P1 acts as a force to move the hub flange 12 rightward in FIG. 5 through each cam mechanism 22 and each centrifugal element 21. In other words, a force directed to reduce the rotational phase difference between the hub flange 12 and the inertia ring 20 is supposed to act on the hub flange 12. On the other hand, the second force component P2 moves each centrifugal element 21 radially inward against the centrifugal force.

It should be noted that when the rotational phase difference is reversely produced, the roller 30 is relatively moved along the cam 31 to the left side in FIG. 5. However, the aforementioned actuation principle is also true of this case.

As described above, when the rotational phase difference is produced between the hub flange 12 and the inertia ring 20 by torque fluctuations, the hub flange 12 receives a force (first force component P1) directed to reduce the rotational phase difference between both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

It should be noted that during actuation of the cam mechanisms 22 described above, movement of the centrifugal elements 21 is not restricted by the torsion springs 23. Specifically, when relative rotation occurs between the hub flange 12 and the inertia ring 20 whereby the centrifugal elements 21 are moved, each torsion spring 23 is not elastically deformed as shown in FIGS. 2 and 5. In other words, no change is made for the shape of the triangle formed by connecting the center point of the support portion 230 of each torsion spring 23, the point at which the first contact portion 231a makes contact with the lateral surface 21a of one of the adjacent two centrifugal elements 21, and the point at which the second contact portion 232a makes contact with the lateral surface 21a of the other of the adjacent two centrifugal elements 21. Therefore, in the example shown in FIG. 5, the first contact portion 231a and the lateral surface 21a of one of the adjacent two centrifugal elements 21 make contact with each other without pressing against each other. By contrast, the second contact portion 232a and the lateral surface 21a of the other of the adjacent two centrifugal elements 21 are separated from each other. Therefore, movement of the centrifugal elements 21 is not restricted by the torsion springs 23.

On the other hand, when the hub flange 12 and the inertia ring 20 are stopped rotating and immediately after the hub flange 12 and the inertia ring 20 are prevented from rotating relatively to each other, the centrifugal elements 21 are restricted from radially moving by the torsion springs 23.

Figure 6:
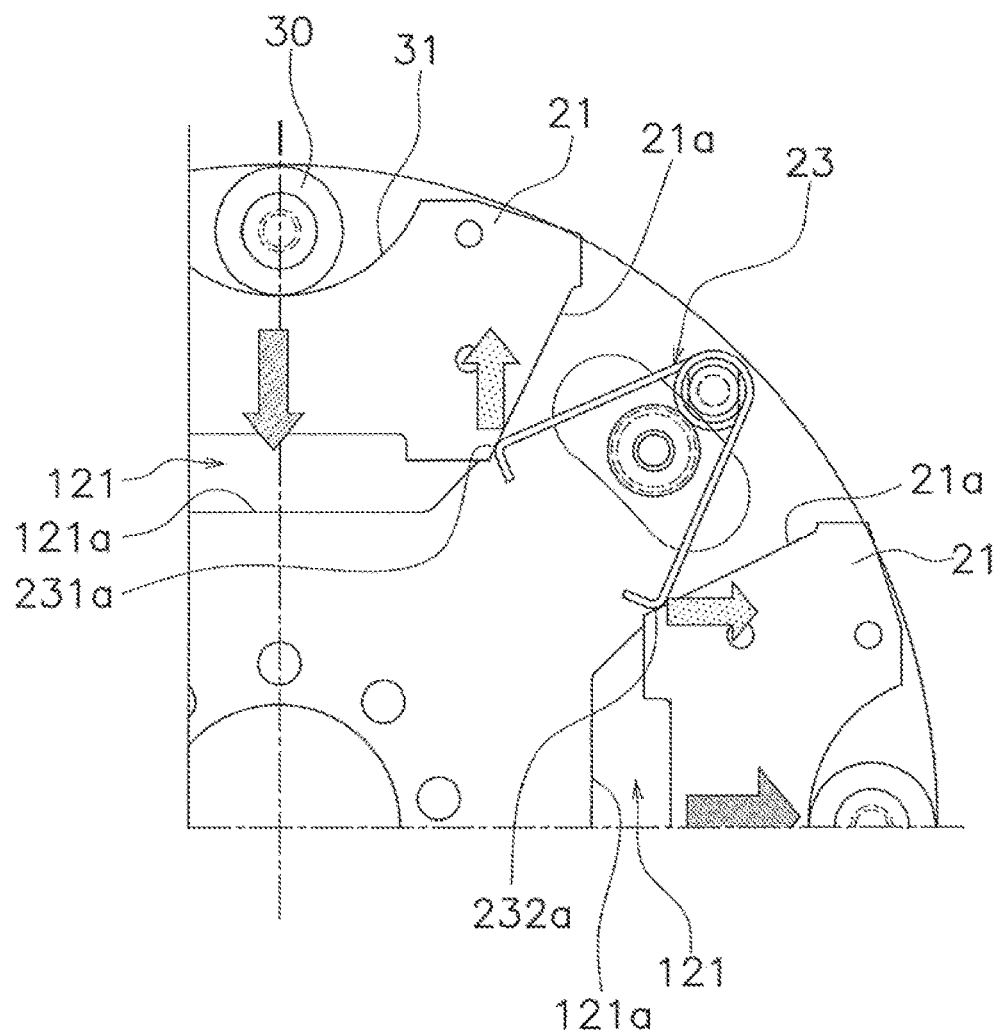
FIG. 6 is a diagram for explaining actuation of a restriction member.

Specifically, when the hub flange 12 and the inertia ring 20 are stopped rotating, centrifugal forces no longer act on the centrifugal elements 21. Therefore, as shown in FIG. 6, one of the four centrifugal elements 21, which is located in the upper position, drops downward (i.e., radially inward). When it is herein assumed that the torsion springs 23 are not provided, the centrifugal element 21 drops downward and collides at the inner peripheral surface thereof with a bottom surface 121a of the recess 121, whereby hitting sound is produced.

However, the torsion springs 23 are provided in the present embodiment. Hence, as shown in FIG. 6, when the centrifugal element 21 is going to drop downward, the first contact portion 231a of the torsion spring 23 makes contact with the inner peripheral end of the lateral surface 21a of the centrifugal element 21. Then, the centrifugal element 21 is restricted from moving further downward from the position shown in FIG. 6 by the elastic force of the torsion spring 23. On the other hand, the second contact portion 232a of the torsion spring 23 similarly makes contact with the inner peripheral end of the lateral surface 21a of the other of the adjacent two centrifugal elements 21, and the other of the adjacent two centrifugal elements 21 also receives a pressing force directed radially outward. Therefore, the inner peripheral surface of the centrifugal element 21 does not collide with the bottom surface 121a of the recess 121, whereby hitting sound can be avoided from being produced in stop of rotation.

It should be noted that the torsion springs 23 are elastically deformed, and hence, the forces, applied by each torsion spring 23 to press the adjacent two centrifugal elements 21 radially outward, are increased in magnitude with increase in radially inward movement of the adjacent two centrifugal elements 21. Because of this, even when moved radially inward with great force and speed, the centrifugal elements 21 can be avoided from colliding with the bottom surfaces 121a of the recesses 121.

Moreover, because of a similar reason to the above, hitting sound can be also inhibited from being produced between each torsion spring 23 and the adjacent two centrifugal elements 21 by setting the gaps between the contact portions 231a and 232a of each torsion spring 23 and the lateral surfaces 21a of the adjacent two centrifugal elements 21 to "0" or as small as possible during actuation of the cam mechanisms 22.

On the other hand, when relative rotational angle is increased between the hub flange 12 and the first and second inertia rings 201 and 202, the stopper mechanisms 15 are actuated whereby relative rotation is prevented between the hub flange 12 and the first and second inertia rings 201 and 202. Accordingly, the cam mechanisms 22 are no longer actuated. However, the cam mechanisms 22 have been actuated and the centrifugal elements 21 have received forces to move them radially inward till the actuation of the stopper mechanisms 15. Hence, even when the stopper mechanisms 15 are actuated, the centrifugal elements 21 are going to move radially inward due to inertias that have acted thereon until then.

Figure 7:
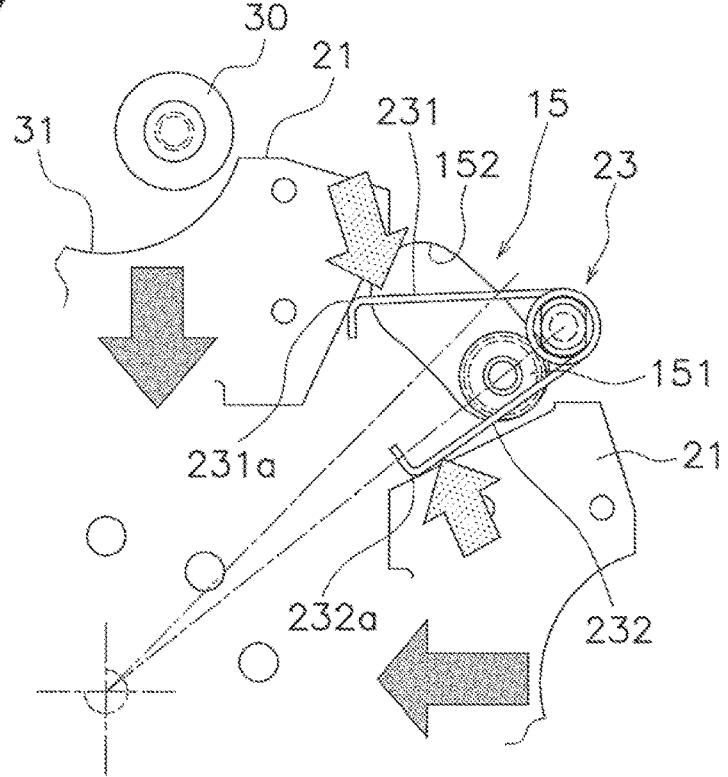
FIG. 7 is a diagram for explaining the actuation of the restriction member.

In this case, as shown in FIG. 7, the lateral surfaces 21a of the adjacent two centrifugal elements 21 press the first and second contact portions 231a and 232a of each torsion spring 23. Each torsion spring 23 is thereby elastically deformed. Accordingly, the centrifugal elements 21 are restricted from moving radially inward by reaction forces applied thereto from each torsion spring 23 in elastic deformation. Therefore, similarly to the above, it is possible to avoid the situation that the centrifugal elements 21 move radially inward due to inertia and collide at the inner peripheral surfaces thereof with the bottom surfaces 121a of the recesses 121. In other words, hitting sound can be avoided from being produced in actuation of the stopper mechanisms 15.

[Exemplary Characteristics]

Figure 8:
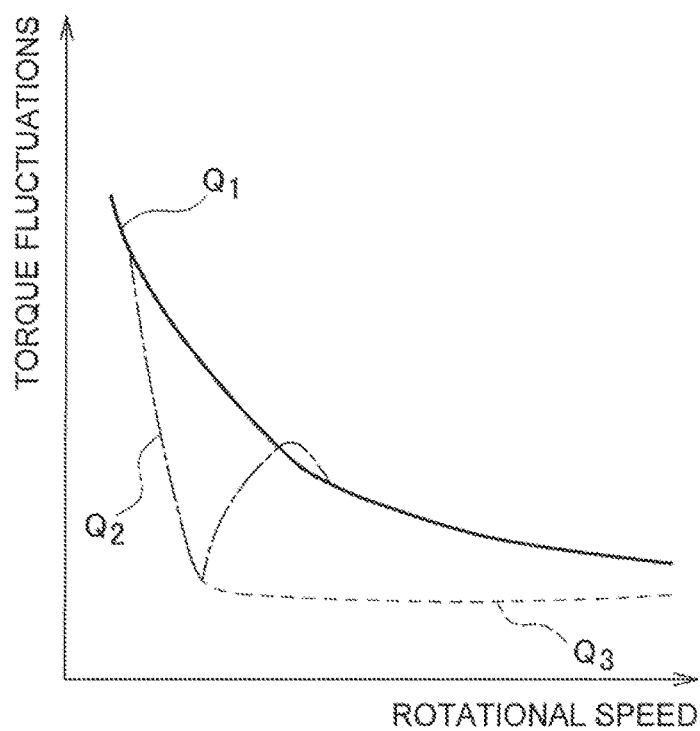
FIG. 8 is a characteristic diagram showing a relation between rotational speed and torque fluctuations.

FIG. 8 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present preferred embodiment.

As is obvious from FIG. 8, in an apparatus in which the well-known dynamic damper device is installed (characteristic Q2), torque fluctuations can be inhibited only in a specific rotational speed range. By contrast, in the present preferred embodiment (characteristic Q3), torque fluctuations can be inhibited through the entire rotational speed ranges.

Second Preferred Embodiment

Figure 9:
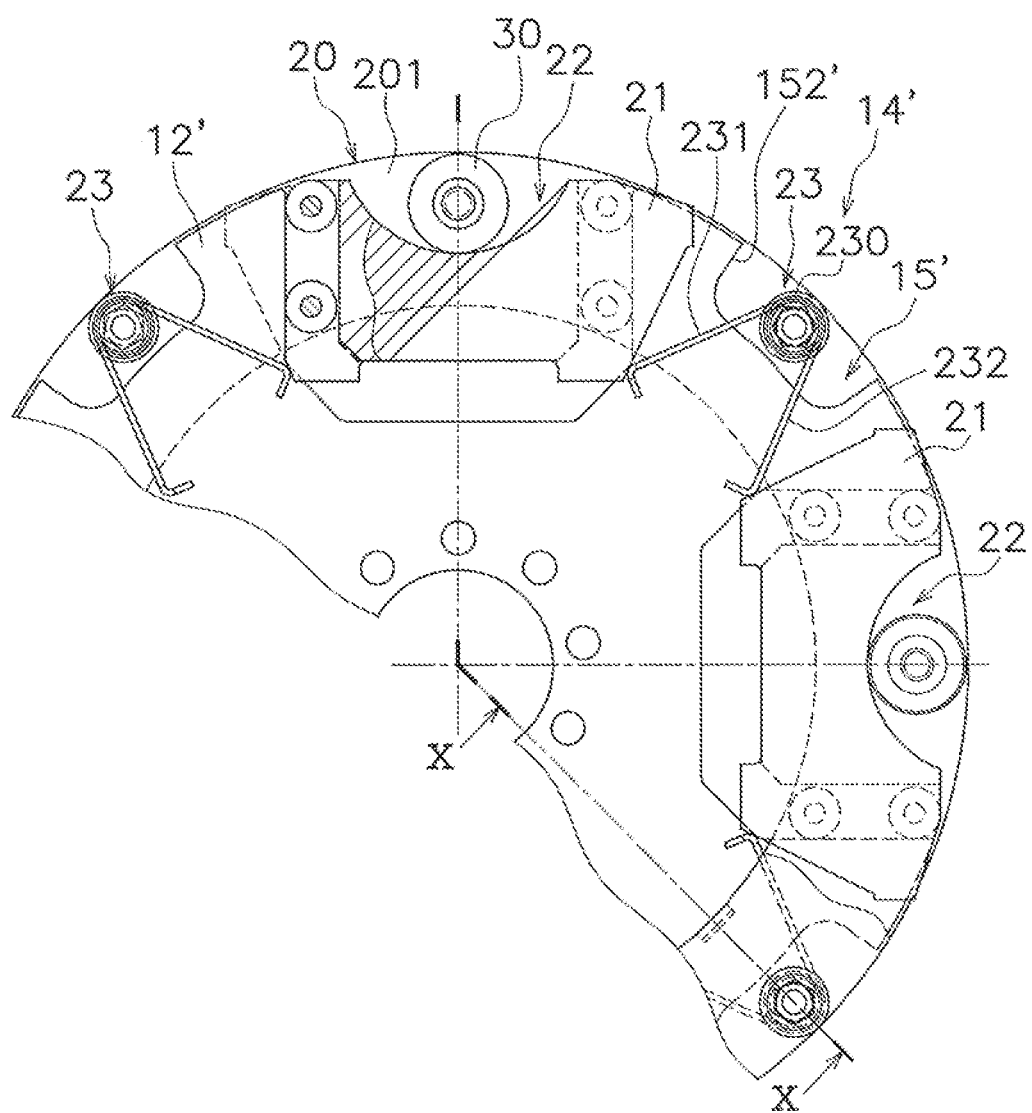
FIG. 9 is a diagram corresponding to FIG. 2 in a second preferred embodiment of the present disclosure.
Figure 10:
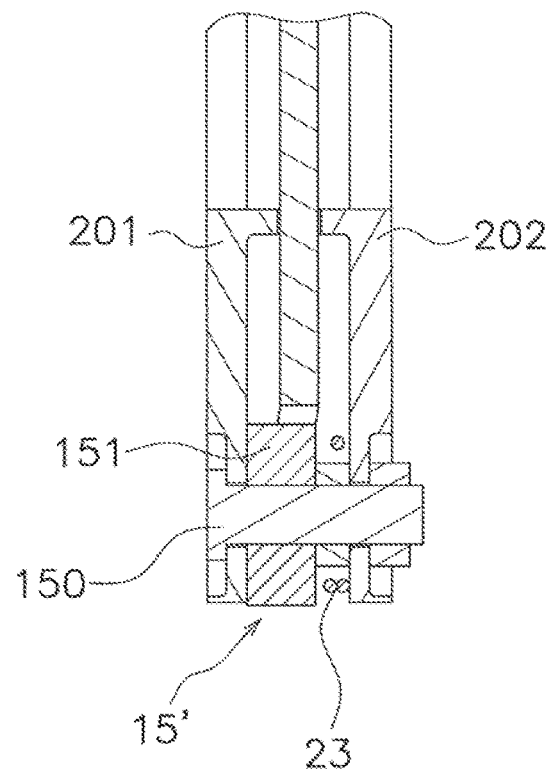
FIG. 10 is a cross-sectional view of FIG. 9 taken along line X-X.

FIGS. 9 and 10 show part of a torque fluctuation inhibiting device 14' according to a second preferred embodiment of the present disclosure, and correspond to FIGS. 2 and 4 in the first preferred embodiment. In other words, FIG. 9 is a front view of the hub flange 12' and the torque fluctuation inhibiting device 14', whereas FIG. 10 is a cross-sectional view of FIG. 9 taken along line X-X.

The torque fluctuation inhibiting device 14' according to the second preferred embodiment is similar to the torque fluctuation inhibiting device 14 according to the first preferred embodiment regarding basic configurations of the cam mechanisms 22 and so forth, but is different from the torque fluctuation inhibiting device 14 according to the first preferred embodiment regarding configurations for supporting the torsion springs 23 and configurations of the stopper mechanisms.

Similarly to the stopper mechanisms 15 according to the first preferred embodiment, stopper mechanisms 15' according to the second preferred embodiment are mechanisms for restricting relative rotation between the flange and the first and second inertia rings to a predetermined angular range.

As shown in FIG. 10, each of the stopper mechanisms 15' includes each of the pins 150 and each of the stop rings 151, both of which are similar to those in the first preferred embodiment. Additionally, each of the stopper mechanisms 15' includes each of cutouts 152' provided in the hub flange 12'. Each cutout 152' has a predetermined length in the circumferential direction and is opened to the outer peripheral side. Each stop ring 151 is disposed in the interior of each cutout 152'.

The aforementioned configuration makes the hub flange 12' and the first and second inertia rings 201 and 202 rotatable relatively to each other in a range that each stop ring 151 is movable within each cutout 152'. In other words, the cam mechanisms 22 are not actuated in and after actuation of the stop mechanisms 15'.

Additionally, the configuration per se of each torsion spring 23 in the second preferred embodiment is similar to that of each torsion spring 23 in the first preferred embodiment. However, each torsion spring 23 is attached at the support portion 230 thereof to the outer periphery of each pin 150. In other words, each pin 150, composing part of each stopper mechanism 15', also functions as a pin for supporting each torsion spring 23.

Other Preferred Embodiments

The present disclosure is not limited to the preferred embodiments described above, and a variety of changes or modifications can be made without departing from the scope of the present disclosure.

(a) In the aforementioned preferred embodiments, each inertia ring is composed of a continuous annular member, but alternatively, can be composed of a plurality of divided inertia bodies disposed in circumferential alignment. In this case, it is required to provide a holding member such as an annular holding ring on the outer peripheral side of the plural inertia bodies so as to hold the plural inertia bodies.

(b) In the aforementioned preferred embodiments, the rollers are disposed as guide parts. However, other members for reducing friction, such as resin races, seats or so forth can be disposed instead.

(c) In the aforementioned preferred embodiments, the torsion springs 23 have been used as the restriction members, but triangular restriction members can be used instead. Each triangular restriction member can have vertices corresponding to the center point of the support portion 230 of each torsion spring 23, the point at which the first contact portion 231a of each torsion spring 23 makes contact with the lateral surface 21a of one of the adjacent two centrifugal elements 21, and the point at which the second contact portion 232a of each torsion spring 23 makes contact with the lateral surface 21a of the other of the adjacent two centrifugal elements 21. In this case, each restriction member is required to be rotatably supported at the vertex corresponding to the center of the support portion 230 by the inertia ring.

(d) In the aforementioned preferred embodiments, each centrifugal element is provided with a cam composing part of each cam mechanism, whereas the inertia ring is provided with a roller as a cam follower. Alternatively, the inertia ring can be provided with the cam, whereas the centrifugal element can be provided with the cam follower.

(e) In the first preferred embodiment, the stop pins of the stopper mechanisms are supported by the inertia ring, whereas the hub flange is provided with elongated holes. Alternatively, the stop pins can be supported by the hub flange, whereas the inertia ring can be provided with the elongated holes.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 11:
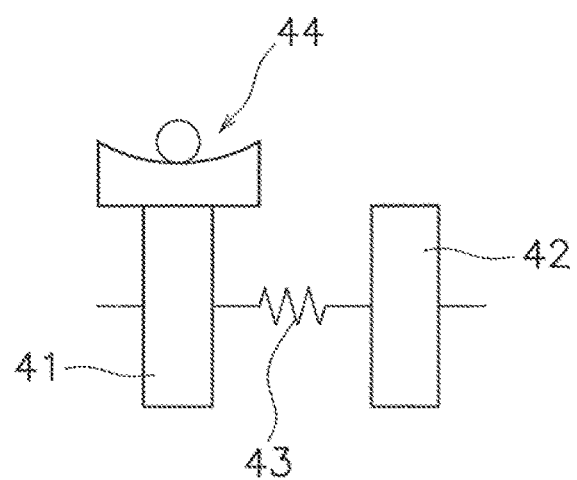
FIG. 11 is a schematic diagram showing application example 1 of the present disclosure.

(1) FIG. 11 is a diagram schematically showing a torque converter. The torque converter includes an input-side rotor 41, a hub flange 42 and a damper 43 disposed between both rotors 41 and 42. The input-side rotor 41 includes members such as a front cover, a drive plate and a piston. The hub flange 42 includes a driven plate and a turbine hub. The damper 43 includes a plurality of torsion springs.

In the example shown in FIG. 11, a centrifugal element is provided on any of rotary elements composing the input-side rotor 41, and a cam mechanism 44 is provided to be actuated with use of a centrifugal force acting on the centrifugal element. Additionally, a torsion spring is provided as a restriction member. A configuration applicable to the cam mechanism 44 and that applicable to the torsion spring are similar to those in the aforementioned respective preferred embodiments.

Figure 12:
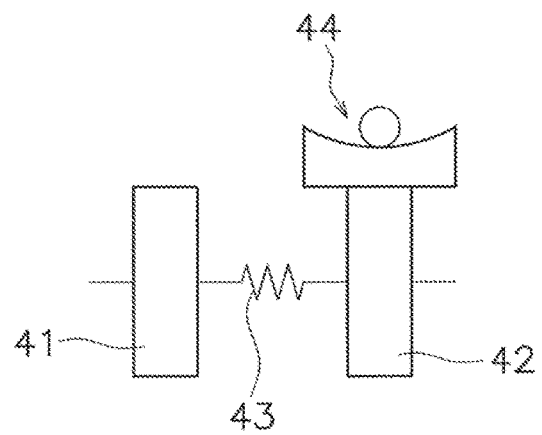
FIG. 12 is a schematic diagram showing application example 2 of the present disclosure.

(2) In a torque converter shown in FIG. 12, a centrifugal element is provided on any of rotary members composing the hub flange 42, and the cam mechanism 44 is provided to be actuated with use of a centrifugal force acting on the centrifugal element. Additionally, a torsion spring is provided. A configuration applicable to the cam mechanism 44 and that applicable to the torsion spring are similar to those in the aforementioned respective preferred embodiments.

Figure 13:
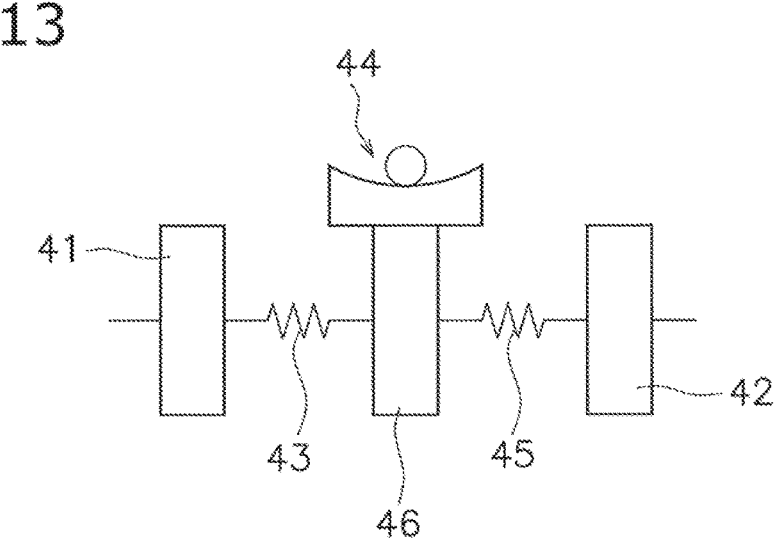
FIG. 13 is a schematic diagram showing application example 3 of the present disclosure.

(3) A torque converter shown in FIG. 13 includes another damper 45 and an intermediate member 46 provided between the two dampers 43 and 45 in addition to the configurations shown in FIGS. 11 and 12. The intermediate member 46 is rotatable relatively to the input-side rotor 41 and the hub flange 42, and makes the two dampers 43 and 45 act in series.

In the example shown in FIG. 13, a centrifugal element is provided on the intermediate member 46, and the cam mechanism 44 is provided to be actuated with use of a centrifugal force acting on the centrifugal element. Additionally, a torsion spring is provided. A configuration applicable to the cam mechanism 44 and that applicable to the torsion spring are similar to those in the aforementioned respective preferred embodiments.

Figure 14:
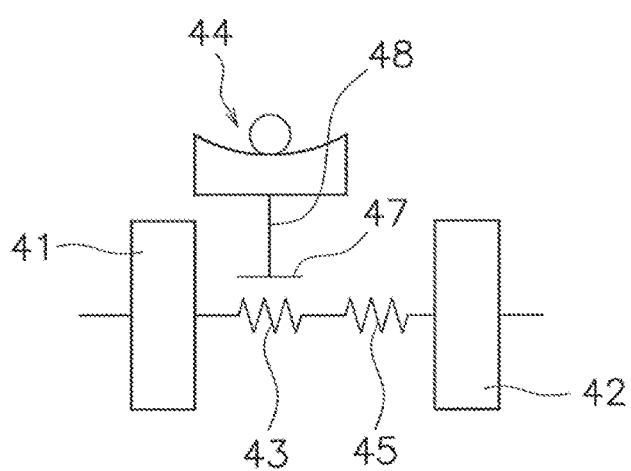
FIG. 14 is a schematic diagram showing application example 4 of the present disclosure.

(4) A torque converter shown in FIG. 14 includes a float member 47. The float member 47 is a member for supporting at least one torsion spring composing the damper 43. For example, the float member 77 has an annular shape and is disposed to cover the at least one torsion spring from the outer peripheral side and at least one lateral side. Additionally, the float member 47 is rotatable relatively to the input-side rotor 41 and the hub flange 42, and is rotated together with the damper 43 by friction with the at least one torsion spring of the damper 43. In other words, the float member 47 is also rotated.

In the example shown in FIG. 14, a centrifugal element 48 is provided on the float member 47, and the cam mechanism 44 is provided to be actuated with use of a centrifugal force acting on the centrifugal element 48. Additionally, a torsion spring is provided. A configuration applicable to the cam mechanism 44 and that applicable to the torsion spring are similar to those in the aforementioned respective preferred embodiments.

Figure 15:
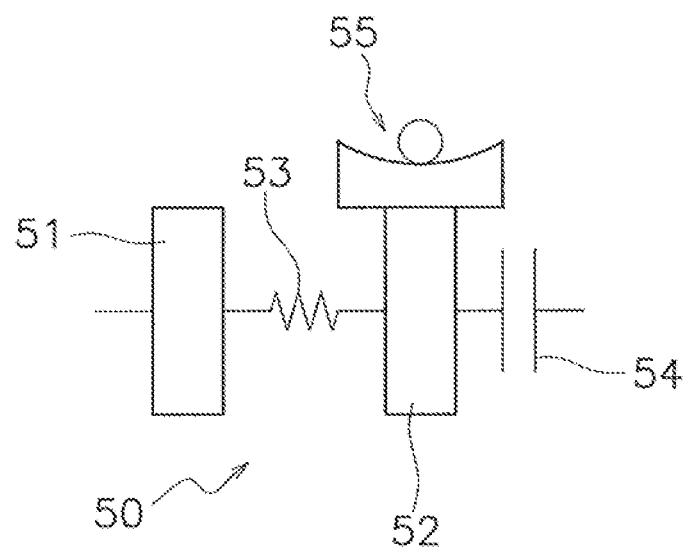
FIG. 15 is a schematic diagram showing application example 5 of the present disclosure.

(5) FIG. 15 is a schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relatively to the first inertia body 51. The damper 53 is disposed between the two inertia bodies 51 and 52. It should be noted that the second inertia body 52 includes a clutch cover composing part of the clutch device 54.

In the example shown in FIG. 15, any of the rotary members composing the second inertia body 52 is provided with a centrifugal element and a cam mechanism 55 is provided to be actuated with use of a centrifugal force acting on the centrifugal element. Additionally, a torsion spring is provided. A configuration applicable to the cam mechanism 55 and that applicable to the torsion spring are similar to those in the aforementioned respective preferred embodiments.

Figure 16:
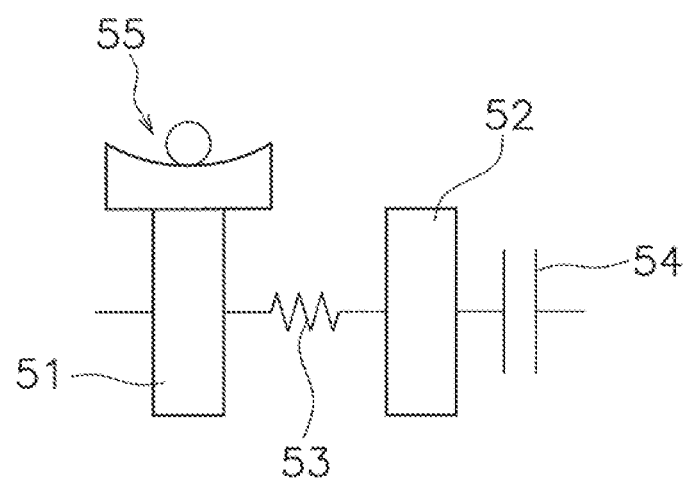
FIG. 16 is a schematic diagram showing application example 6 of the present disclosure.

(6) FIG. 16 shows an example of a power transmission device similar to that shown in FIG. 15. In this example, the first inertia body 51 is provided with a centrifugal element. Additionally, the cam mechanism 55 is provided to be actuated with use of a centrifugal force acting on the centrifugal element. Moreover, a torsion spring is provided. A configuration applicable to the cam mechanism 55 and that applicable to the torsion spring are similar to those in the aforementioned respective preferred embodiments.

Figure 17:
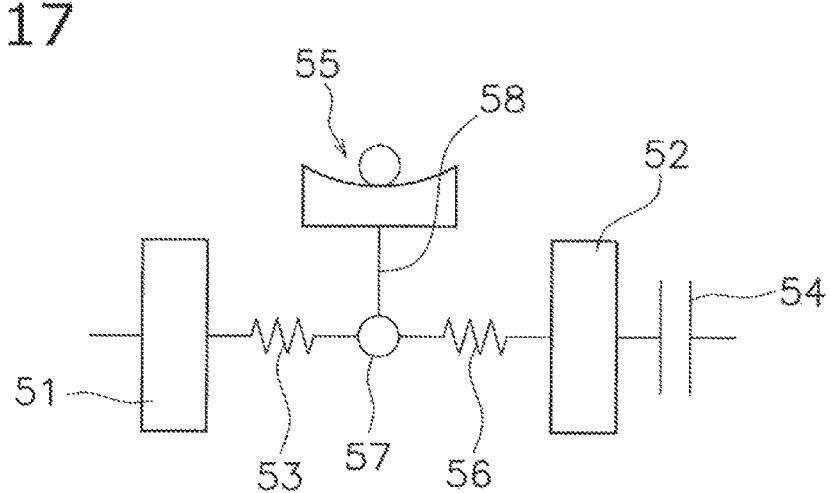
FIG. 17 is a schematic diagram showing application example 7 of the present disclosure.

(7) A power transmission device shown in FIG. 17 includes another damper 56 and an intermediate member 57 provided between two dampers 53 and 56 in addition to the configurations shown in FIGS. 15 and 16. The intermediate member 57 is rotatable relatively to the first inertia body 51 and the second inertia body 52.

In the example shown in FIG. 17, a centrifugal element 58 is provided on the intermediate member 57, and the cam mechanism 55 is provided to be actuated with use of a centrifugal force acting on the centrifugal element 58. Additionally, a torsion spring is provided. A configuration applicable to the cam mechanism 55 and that applicable to the torsion spring are similar to those in the aforementioned respective preferred embodiments.

Figure 18:
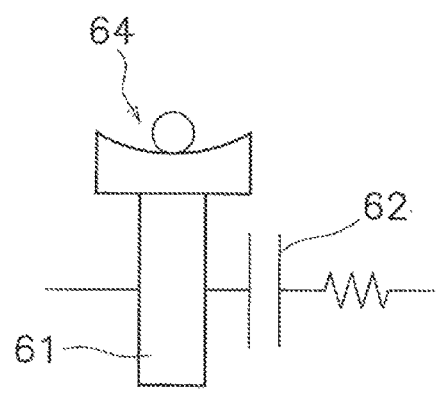
FIG. 18 is a schematic diagram showing application example 8 of the present disclosure.

(8) FIG. 18 is a schematic diagram of a power transmission device that a clutch device is provided on one flywheel. In FIG. 18, a first inertia body 61 includes one flywheel and a clutch cover of a clutch device 62. In this example, any of the rotary members composing the first inertia body 61 is provided with a centrifugal element, and a cam mechanism 64 is provided to be actuated with use of a centrifugal force acting on the centrifugal element. Additionally, a torsion spring is provided. A configuration applicable to the cam mechanism 64 and that applicable to the torsion spring are similar to those in the aforementioned respective preferred embodiments.

Figure 19:
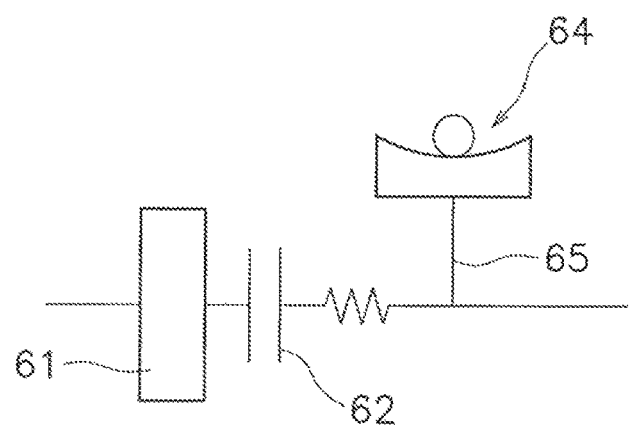
FIG. 19 is a schematic diagram showing application example 9 of the present disclosure.

(9) FIG. 19 shows an example of a power transmission device similar to that shown in FIG. 18. In this example, a centrifugal element 65 is provided on an output side of the clutch device 62. Additionally, the cam mechanism 64 is provided to be actuated with use of a centrifugal force acting on the centrifugal element 65. Moreover, a torsion spring is provided. A configuration applicable to the cam mechanism 64 and that applicable to the torsion spring are similar to those in the aforementioned respective preferred embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

INDUSTRIAL APPLICABILITY

According to the present disclosure, it is possible to inhibit, in a torque fluctuation inhibiting device using a centrifugal element, a hitting sound from being produced in a collision of the centrifugal element against another member.

What is claimed is:
1. A torque fluctuation inhibiting device for inhibiting torque fluctuations in a rotor to which a torque is inputted, the torque fluctuation inhibiting device comprising:
  a mass body disposed to be rotatable with the rotor and be rotatable relatively to the rotor;
  a plurality of centrifugal elements each radially movable by a centrifugal force that acts thereon in rotation of the rotor and the mass body;
  a plurality of cam mechanisms each for converting the centrifugal force into a circumferential force when a relative displacement is produced between the rotor and the mass body in a rotational direction while the centrifugal force is acting on the each of the plurality of centrifugal elements, the circumferential force directed to reduce the relative displacement; and
  a plurality of restriction members for allowing the plurality of centrifugal elements to move in actuation of the plurality of cam mechanisms, the plurality of restriction members for restricting the plurality of centrifugal elements from moving radially inward in non-actuation of the plurality of cam mechanisms.

2. The torque fluctuation inhibiting device according to claim 1, wherein the plurality of centrifugal elements are disposed in circumferential alignment, and each of the plurality of restriction members is disposed circumferentially between adjacent two of the plurality of centrifugal elements.

3. The torque fluctuation inhibiting device according to claim 2, wherein
the each of the plurality of restriction members includes a first contact portion provided on one circumferential end thereof and a second contact portion provided on the other circumferential end thereof,
the first contact portion is contactable to a first circumferential side lateral surface of one of the adjacent two of the plurality of centrifugal elements, and
the second contact portion is contactable to a second circumferential side lateral surface of the other of the adjacent two of the plurality of centrifugal elements.

4. The torque fluctuation inhibiting device according to claim 3, wherein the each of the plurality of restriction members is elastically deformable in accordance with movement of the adjacent two of the plurality of centrifugal elements.

5. The torque fluctuation inhibiting device according to claim 3, wherein the each of the plurality of restriction members is elastically deformable in directions that make the first contact portion and the second contact portion approach each other.

6. The torque fluctuation inhibiting device according to claim 3, further comprising:
a stopper mechanism for restricting a relative rotation between the rotor and the mass body to a predetermined angular range, the stopper mechanism including a stop pin and an elongated hole, the stop pin supported by one of the rotor and the mass body, the elongated hole provided in the other of the rotor and the mass body, the elongated hole circumferentially elongated, the elongated hole penetrated by the stop pin.

7. The torque fluctuation inhibiting device according to claim 6, wherein the plurality of restriction members each includes
a support portion supported by the mass body,
a first spring portion extending radially inward from the support portion, the first spring portion including a first contact portion on a tip thereof, and
a second spring portion extending radially inward from the support portion so as to gradually separate from the first spring portion with radially inward extension thereof, the second spring portion including a second contact portion on a tip thereof.

8. The torque fluctuation inhibiting device according to claim 7, wherein the support portion of the each of the plurality of restriction members is supported by a stop pin.

9. The torque fluctuation inhibiting device according to claim 1, wherein
the rotor includes a plurality of recesses on an outer peripheral surface thereof,
the plurality of centrifugal elements are accommodated in the plurality of recesses of the rotor respectively, and
the plurality of restriction members restrict inner peripheral surfaces of the plurality of centrifugal elements from making contact with bottom surfaces of the plurality of recesses respectively.

10. The torque fluctuation inhibiting device according to claim 1, wherein the plurality of cam mechanisms each includes
a cam provided on one of the mass body and the each of the plurality of centrifugal elements, and
a cam follower provided on the other of the mass body and the each of the plurality of centrifugal elements, the cam follower moved along the cam.

11. The torque fluctuation inhibiting device according to claim 10, wherein the cam and the cam follower of the each of the plurality of cam mechanisms are not pressed against each other in non-actuation of the each of the plurality of cam mechanisms.

12. The torque fluctuation inhibiting device according to claim 10, wherein
the mass body includes a first inertia ring, a second inertia ring and a pin, the first and second inertia rings disposed in opposition through the rotor, the pin coupling the first and second inertia rings so as to make the first and second inertia rings non-rotatable relatively to each other,
the plurality of centrifugal elements are disposed on an outer peripheral part of the rotor and on an inner peripheral side of the pin while disposed axially between the first inertia ring and the second inertia ring,
the cam follower is a cylindrical roller, the cylindrical roller including a hole in an inner part thereof the hole axially penetrated by the pin, and
the cam is provided on the each of the plurality of centrifugal elements so as to make contact with the cam follower, the cam having a shape making the circumferential force vary in accordance with an amount of the relative displacement between the rotor and the mass body in the rotational direction.

13. The torque fluctuation inhibiting device according to claim 1, further comprising:
a stopper mechanism for restricting a relative rotation between the rotor and the mass body to a predetermined angular range, wherein
the plurality of cam mechanisms are not actuated in and after actuation of the stopper mechanism.

14. A torque converter disposed between an engine and a transmission, the torque converter comprising:
an input-side rotor to which a torque is inputted from the engine;
an output-side rotor for outputting the torque to the transmission;
a damper disposed between the input-side rotor and the output-side rotor; and
the torque fluctuation inhibiting device recited in claim 1.

15. A power transmission device comprising:
a flywheel including a first inertia body, a second inertia body and a damper, the first inertia body rotated about a rotational axis, the second inertia body rotated about the rotational axis, the second inertia body rotatable relatively to the first inertia body, the damper disposed between the first inertia body and the second inertia body;
a clutch device provided on the second inertia body of the flywheel; and
the torque fluctuation inhibiting device recited in claim 1.

* * * * *